Aug. 12, 1958   A. J. DOUMAK ET AL   2,847,311
CONFECTION AND PROCESS FOR PRODUCING THE SAME
Filed April 17, 1956
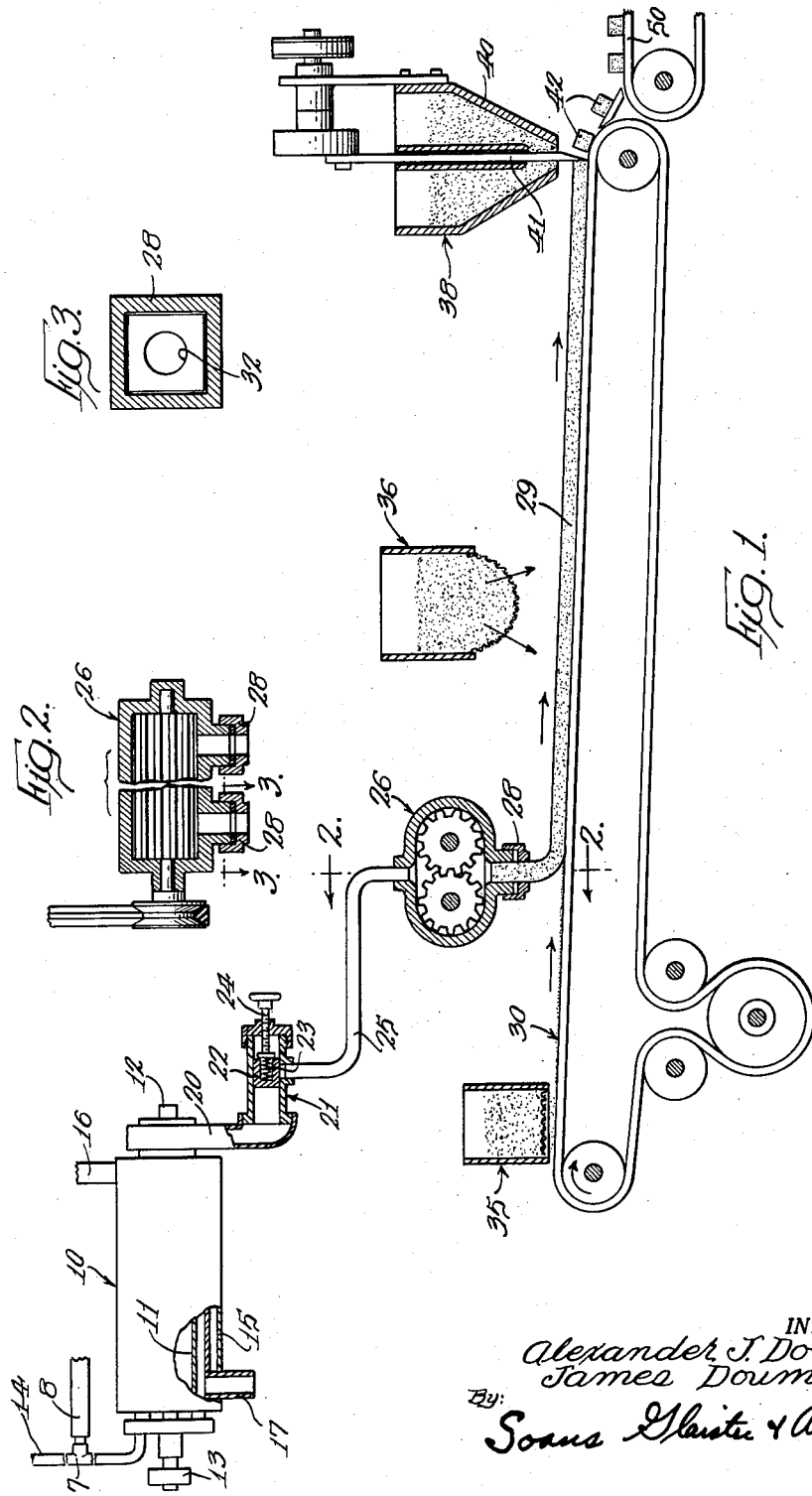
INVENTORS.
Alexander J. Doumak
James Doumak
By:
Soans Gleister & Anderson
Attys.

United States Patent Office 2,847,311
Patented Aug. 12, 1958

2,847,311

CONFECTION AND PROCESS FOR PRODUCING THE SAME

Alexander J. Doumak, Los Angeles, Calif., and James Doumak, deceased, late of Los Angeles, Calif., by Maria J. Doumakes, executrix, Los Angeles, Calif., assignors to National Dairy Products Corporation, a corporation of Delaware Application April 17, 1956, Serial No. 578,653

6 Claims. (Cl. 99—134)

This invention relates to the production of confections and has particular reference to marshmallows and the like, and to a process for making the same.

Conventional methods for the production of marshmallows and similar confections are laborious and time-consuming. In processes heretofore known, the sugar, glucose, water and other ingredients such as starch, salt, flavoring agents and the like are heated to form a syrup to which is added a solution of gelatin. This mixture is then placed in an open beater or otherwise agitated to produce a homogeneous mass which is cast or injected into starch molds.

The composition of the starch is such as to reduce the moisture content by absorption to the generally accepted figure of about 18 percent by weight. Marshmallows having a water content appreciably above this figure are subject to sticking and fermentation on standing, but the initial water content must be in the range of about 26 percent in order to obtain the fluidity which is necessary to facilitate the casting operation. The mix must remain in contact with the starch mold for a sufficient length of time to bring the initially high moisture content to the required level, and this generally takes more than twelve hours.

When the desired moisture level is reached, the cast product is removed from the molds, thoroughly brushed to remove adhering starch particles, sugared, permitted to "sweat" or cure for from two to three hours, sifted and then packaged.

Such conventional methods are subject to disadvantages other than the excessive length of time required to produce a packaged product. The casting operation does not readily permit the utilization of a continuous process because of the required molding time, and additionally, time and labor must be expended in processing the molding starch after each use. It must be sifted through a fine sieve to remove all wood splinters from starch trays and tailings, and then passed through a heating unit to dry the moisture removed from the marshmallows. The dry starch is then cooled to about 95° F. and returned to the starch trays to be reused.

The use of starch in this manner is further disadvantageous in that it produces an excessive quantity of highly objectionable dust during transport of the starch trays among the various stations during the operation.

One of the principal objects of this invention is to provide a novel marshmallow, and a process for producing the same which overcomes the above and other disadvantages of heretofore known methods.

Another object of this invention is to provide a continuous in-line process for the production of marshmallows and similar confections.

Another object of this invention is to provide a process for producing marshmallows and similar confections which requires an initial investment in equipment considerably below that required for conventional processes, and the cost of operation of which process is as much as one-half or less of the operating costs required for conventional processes.

Another object of this invention is to provide a novel marshmallow and a process for making the same, the marshmallow having a light, tender, fluffy texture and, accordingly, having a high consumer appeal.

Yet another object of this invention is to provide a novel process for the production of marshmallows and the like, which can be accurately controlled to provide a product of uniformly high quality.

Other objects and advantages of this invention, it is believed, will be readily apparent from the following detailed description of preferred embodiments thereof when read in connection with the accompanying drawings:

In the drawings:

Figure 1 is a side elevation of an apparatus used in carrying out the method of this invention, parts of the apparatus being illustrated diagrammatically.

Figure 2 is a sectional elevation view taken along line 2—2 of Figure 1.

Figure 3 is also a sectional elevation view taken along line 3—3 of Figure 1.

In accordance with the process of the invention, ingredients which have been heretofore employed in the manufacture of conventional marshmallows are used. However, the type of ingredient utilized is, in certain instances, different and the processing conditions are quite distinct from the prior art procedures.

In the manufacture of the confection product of the invention, the ingredients include a mono-saccharide, such as glucose, a di-saccharide, such as sucrose, and a gelatin. A gelatin may be selected which has desired properties prior to substantial gelling but a set condition is preferable effected by the use of a starch or a product having starch-like characteristics. In general, raw starches of corn, potato, sago, tapioca, or waxy maize are preferred, as distinguished from high fluidity and oxidized starches, British gums, and white and yellow dextrin. By the term "raw starch," we mean to include starches which are treated in the conventional ways to provide the various starches of commerce.

An important feature of this invention is that the product processed in accordance with this invention contains substantially the amount of moisture in the desired end product. In this connection, the moisture in the product processed is below 19 percent and may be as low as about 13 percent. This is to be distinguished from the previously described cast marshmallow processes which use a mix containing about 26 percent moisture, the excess moisture being removed by starch absorption.

The gelatin may be any of several commercially available gelatins but desirably should be a gelatin having increased whipping properties, as for example a gelatin produced in accordance with the disclosure set forth in Patent No. 2,196,300. Preferably, the bloom strength of the gelatin should be below about 300. Bloom strength is measured by the AOAC method specified in the 7th edition (1950). The viscosity of the gelatin is desirable below 70 millipoises when using 6⅔ percent aqueous solution at 60° C. and a standard viscosity pipette.

The ratio of mono-saccharide to di-saccharide may be greater or less than 1 depending, in part, upon the body characteristics desired in the end product. In general, when a tender, low density product is desired, the ratio of mono-saccharide to di-saccharide may be less than 1. However, as the amount of di-saccharide, relative to mono-saccharide, is increased, crystallization may become a more significant limitation, particularly in view of the low moisture conditions of the invention. We have found that the ratio of mono-saccharide to di-saccharide should not be less than about .5. However, the ratio should not greatly exceed 1.5 because the higher ratios usually result in a product having excessive sticking tendencies.

In the manufacture of the product of the invention, the ratio of mono-saccharide to di-saccharide may be reduced below 1, but, as indicated, the relative amount of di-saccharide to mono-saccharide is increased, care must be taken to avoid crystallization. In other words, the lower limit of the ratio of mono-saccharide to di-saccharide is substantially established by the crystallizing properties of the di-saccharide (sucrose).

The product of the invention contains a gas which is uniformly distributed through the product in fine dispersion. Such distribution and fine dispersion is a function of beating and gas pressure. When beating the low moisture product of the invention with available equipment, we have found it necessary to employ a gas pressure in the beating zone in excess of about 175 p. s. i., while at the same time providing sufficient beating action or shearing forces to effect fine dispersion of the gas. In general, most of the gas bubbles or cells should be minute and uniformly dispersed.

The gas pressure employed will, of course, exceed the pressure in the beating zone and we have found that a pressure increase of from 50 p. s. i. to 75 p. s. i. over the pressure in the beating zone is highly satisfactory for best gas incorporation.

The satisfactory rate of introduction of gas should be correlated with the beating so that "burping" does not occur. That is to say, the gas should not be introduced at a rate in excess of that which can be incorporated into the product.

In order to provide the product of the invention, it should have a density between about 30 ounces per gallon and about 65 ounces per gallon.

The gas employed should be substantially insoluble in the product and should be non-toxic. Air and nitrogen are excellent for these purposes.

The body characteristics of the product and the degree of air incorporation are, in part, a function of the moisture content of the product during whipping or beating. As the moisture content is increased within the range specified, the product more readily incorporates air with equivalent beating.

As indicated, it is not necessary to include starch in the product of the invention. However, the use of starch in the formula greatly facilitates the manufacture of the product and appears necessary for high production. In general, the starch and gelatin will be present in about equal amounts but the amount of starch can exceed the amount of gelatin. We believe that the starch effects certain quick setting of the product after extrusion and prior to substantial gelling of the gelatin. This quick setting feature appears to reduce slumping upon extrusion of the product so that it may be mechanically cut without substantial distortion. While the formulation may be adjusted with the use of gelatin alone, most desired results occur with the use of starch in the formula.

The important feature of our invention is the extrusion of a product which will not slump, i. e. substantially deform after extrusion during a period of product quiescence, which can be mechanically cut or severed shortly after extrusion to provide uniformly shaped units, and which will not stick together during storage. Such body characteristics are not only a function of the ingredients in the product but are also a function of the degree of beating and air incorporation, and the treatment after cutting.

Accordingly, the product of our invention is dependent upon the amount of the various ingredients used, the relation of the ingredients to one another, the degree of beating, the amount of air incorporation, and other processing conditions. Because of the inter-relation of these various factors, it will be understood that one factor can be changed to compensate for a variation in another factor to provide the desirable features of this invention.

We have found that a controlling factor in providing a non-slumping product is the discharge temperature, i. e. the temperature at which the product is discharged from a nozzle or manifold. In general, this temperature should be below about 130° F. and above about 105° F. At higher temperatures, i. e. above 130° F., the product tends to slump after discharge, while at temperatures below about 105° F. power requirements become excessive and satisfactory cutting or severing of the product is difficult. It will be understood, however, that some variations from this temperature range may be effected in the event of unusual formulations.

As above indicated, cutting of the product of the invention should be effected after the establishment of product quiescence and prior to the time when substantial gelling occurs.

An important feature of the invention is, therefore, the establishment of a quiescent condition in a non-slumping product after extrusion from a zone of turbulence, and the cutting or severing the product prior to substantial gelling.

Prior to cutting or severing, and therefore prior to substantial gelling, the product is substantially uniformly coated with a starch-sugar mixture to facilitate cutting and also to provide a desired surface condition which prevents sticking of the product. Following cutting, the product should be suitably cured and tumbled or worked to provide a uniformly shaped product free from distortion, tails and sticking.

We have found that the most effective means for severing the product is a reciprocating knife coated with starch. While other mechanical arrangements may be feasible, the reciprocating, starch coated knife has been found to provide a most simple and convenient operation. We have further found that complete severance of the product by the knife is not required and that subsequent working or tumbling after partial cutting will effectively sever the product.

The product of the invention comprises less than about 19 percent moisture and more than about 13 percent moisture. The saccharide content is less than about 80 percent, the ratio of mono-saccharide to di-saccharide being in the range from about .5 to about 1.5. The gelatin and starch in the product comprise, in the aggregate, with generally available gelatins and starches, less than about 7 percent of the product. It will, of course, be understood that suitable flavoring and coloring agents may be added, as desired.

In blending the ingredients, the di-saccharide, part of the mono-saccharide, about one-half of the total quantity of water, and starch may be placed in a steam jacketed kettle and brought to a boil, whereupon the remainder of the mono-saccharide can be immediately added to bring the temperature down below boiling. The resulting syrup may be transferred to a holding tank provided with cooling coils and there cooled to below about 165° F. The cooled syrup may then been transferred to still another tank provided with cooling coils and, at this point, the gelatin, separately hydrated in the remaining portion of water, can be added and the batch agitated and cooled to below about 160° F.

In further carrying out the process of this invention, the syrup-gelatin blend is continuously pumped to a closed beater, generally indicated 10, which preferably is of the Votator type. The beater may comprise a horizontally disposed enclosed cylinder 11, axially through which extends a shaft 12 driven through the pulley 13 and provided with longitudinal agitator knives (not shown) which also function to scrape clean the interior side wall of the cylinder, in a manner familiar to those skilled in the art.

A feed pipe 14 leads into the upper portion of the intake end of the beater 10, through which pipe the cooled syrup mix is continuously forced into the interior of the beater, the working pressure therein being above about 200 pounds per square inch. A T connection 7 and inlet line 8 are provided in the feed pipe 14, and air under a pressure of about 250 pounds per square inch is delivered to the mix in the beater through the line 8 and connection 7. During operation, the beater is preferably cooled by passing water through the cooling jacket 15, inlet and outlet pipes 16 and 17, respectively, being provided.

Any one portion of the syrup is normally in the beater not more than about 30 seconds, and during the beating process, by means of the combination of pressure and injection of the high pressure compressed air, and also due to the relatively low water content of the starting material, a very stiff or firm mix is obtained which permits extrusion thereof in the form of continuous strands, as will be explained more fully hereinafter.

From the beater, the beaten mix is forced through a delivery pipe 20, and the flow of mix through this pipe may be impeded by a back pressure valve 21 by which the desired working pressure within the beater is maintained. The valve shown is provided with a pressure regulating plunger 22 in which is seated a helical compression spring 23, the pressure of which is regulated by an adjustable screw member 24.

The mix may then be delivered through pipe 25 to a gear pump 26, the outlet of which comprises a series of extrusion nozzles 28. The pump forces or extrudes the mix through the nozzles, forming it into a series of continuous, parallel strands 29 which are received on the travelling belt 30. As shown in Figure 3, the nozzles 28 are provided with circular orifices 32, but it will be understood that orifices of other shapes may be used to provide any desired cross-sectional contour to the strands.

We have found, in a highly satisfactory commercial operation, that the gear pump 26 and the back pressure valve 21 may be eliminated. When this is done, the back pressure is supplied by the friction of the pipe 25, which may be of extended length, and the back pressure of the extrusion nozzles 28 or manifold. In other words, in certain installations, as effective operations may be established by equivalent means other than the back pressure valve 21 and gear pump 26.

At the forward end of, and above, the belt 30 is a dispensing device 35 which continuously dusts powdered starch onto the belt; and, intermediate the ends of, and above, the belt is a second dispenser 36 which dusts a coating of powdered starch upon the tops of the advancing strands.

A cutter unit 38 is positioned above the rearward end of the conveyor belt 30, and consists of a hopper 40 within which reciprocates an elongated guillotine knife 41 which severs the strands 29 to form the individual marshmallows 42. It is apparent that the speed of reciprocation of the knife, as compared to the speed of advancement of the belt, determines the length of the marshmallows 42. Powdered starch is preferably maintained in the hopper 40; and, with each downward movement of the knife 41, a portion of the starch is carried therewith to coat the cut surfaces of the marshmallows, the starch also functioning as a lubricant to facilitate the cutting operation.

The cut and starch-covered marshmallows are then conveyed by the belt 50 to a conventional tumbler and screening device (not shown) which first functions as a sander to cover all raw surfaces with starch to prevent sticking of the individual pieces during further processing, and then functions to remove excess starch through the screening device. The marshmallows are next cured, preferably by conveying them through a tunnel (not shown). Depending upon the conditions prevailing, cool air or heated air is passed through the tunnel to provide the desired curing atmosphere in the tunnel. After curing, the pieces are again tumbled and a mixture of sugar and starch is applied to the surfaces.

The sugared marshmallows may next be placed in storage trays and may be stored to permit further curing action. The cured marshmallows may be sieved in a revolving wire drum to remove the excess sugar-starch dusting mix and are then packaged.

*Specific example*

Into a Groen kettle was introduced 11 gallons of water, and 300 pounds of dextrose (about 90 percent solids), 50 pounds of amioca starch (about 88 percent solids) and 700 pounds of sucrose were sifted into the water. The kettle was heated to raise the temperature of the mix to 245° F., whereupon the heat was turned off. Next, 780 pounds of corn syrup (54DE with about 81.5 percent solids) was added to the cooked mix causing the temperature to drop to about 190° F. The mixture was then cooled further to 160° F.

In another Groen kettle, 11 gallons of water was heated to about 165° F. and 38 pounds of gelatin (about 90 percent solids) having a bloom value of about 225 and a gel of about 45 was added to the water. The gelatin and water was agitated, and the gelatin was hydrated in about 15 minutes.

The hydrated gelatin was mixed with the water-starch-saccharide mixture and the resulting mix was cooled to about 130° F. and introduced into a Votator mixer. Compressed air was introduced into the Votator mixer at about 300 p. s. i. and a back pressure valve was adjusted to maintain a pressure of 225 p. s. i.±15 p. s. i. The volume of air was adjusted to provide a product having an over-run of about 420 percent. The cooling water to the Votator mixer was adjusted to discharge the product at about 113° F.

The belt was operated at such a speed that the time of quiescence of the product prior to cutting was about one minute. We have found that the time with this formula cannot exceed about ten minutes.

On the belt the product was dusted with a mixture of corn starch (64 percent) and sugar (36 percent).

The cut marshmallows passed along a sloping screen and through a tumbler. The tumbled marshmallows were cooled in a tunnel with 60° F. air and held in trays for about 3 hours. After curing, the marshmallows were again tumbled and then packaged.

In other runs, potato, corn and tapioca starches have been employed with success. In addition, gelatins having higher bloom values have been used. In a run, starch was eliminated and half of the starch replaced with gelatin in the above formula. When cutting was effected in less than one minute at an output temperature of about 110° F., a satisfactory product was obtained.

An attempt has been made to measure the physical character of the product at the critical time for cutting. However, a satisfactory criterion, other than cutting characteristics, has not been established. In this connection, if insufficient quiescent time is provided, the product will distort under the impact of the knife and if excessive gelling occurs, the product will not readily cut and the resulting product will have tails.

Thus, in the broadest aspect, our invention lies in extruding a low moisture, non-slumping confection containing uniformly dispersed air and maintaining quiescence in the product for a time sufficient to permit setting, the product being cut prior to substantial gelling.

As has been previously pointed out and as will be apparent from the foregoing, the product extruded to the quiescent state is affected by the degree of beating, air incorporation, the moisture content, the amount of the gelatin (and starch), the ratio of mono-saccharide to di-saccharide, the temperature at the time of extrusion, etc. These various factors may be adjusted relative to one another to provide a non-slumping product of desired density. These various factors may be regulated within the teachings of this specification and of the skill of the art to provide a product which can be mechanically cut prior to substantial gelling.

A "substantial gelling" condition occurs when cutting leaves tails on the product, and/or when the product has substantial resilience. Substantial gelling also occurs when the substantially cut marshmallows cannot be readily separated.

From the above description, it will be understood that a speedy, continuous process for the production of marshmallow-type confections has been provided. The entire process is carried out within a period of about two and one-half hours, as compared to the minimum time of about six and one-half hours required for prior art processes. The actual time required for the present process may be reduced to about thirty minutes if the sweating operation is shortened. Additionally, the labor and equipment requirements of the process of this invention are less than one-half of those for the heretofore known processes. Since the mix is prepared prior to mixing with about the proportion of moisture desired in the final product, the process does not depend upon starch as a medium to reduce the moisture content. Accordingly, accurate control of the moisture content of the finished product is assured through use of the process of this invention.

By means of the present process and formulation, a finished product having great consumer appeal is produced. The marshmallow has a smooth texture, and may be light and fluffy, the density thereof being of the order of forty percent less than that of conventional marshmallows. The marshmallows of this invention may not have a coarse starch crust of the type processed by prior art confections.

This application is a continuation-in-part of our copending application filed March 5, 1950, Serial Number 147,946, for Method and Apparatus for Manufacturing Marshmallows and Similar Confections, now abandoned; and of our copending application filed December 15, 1952, Serial Number 326,070, for Confection and Process for Producing the Same, now abandoned.

While we have shown and described specific embodiments of our invention, we do not limit ourselves to the exact details of the constructions set forth, and the invention embraces such changes, modifications, and equivalents of the parts and their formation and arrangement as coming within the purview of the appended claims.

What is claimed is:

1. A continuous process for manufacturing marshmallows comprising the steps of preparing a mixture of saccharides, gelatin and moisture, the moisture comprising less than about 19 percent and more than about 13 percent of said mixture, the saccharides comprising monosaccharides and disaccharides in a ratio of between about .5 and about 1.5, beating said mixture under gas pressure to provide a product having a density of from about 30 ounces per gallon to about 65 ounces per gallon, extruding said product in a continuous strip into a zone of product quiescence and cutting said product after a period of quiescence and prior to substantial gelling.

2. A continuous process for manufacturing marshmallows comprising the steps of preparing a mixture of saccharides, starch, gelatin and moisture, the moisture comprising less than about 19 percent and more than about 13 percent of said mixture, the aggregate of said starch and said gelatin being less than about 7 percent, the saccharides comprising mono-saccharides and di-saccharides, the ratio of mono-saccharides to di-saccharides being in the range of from about .5 to about 1.5, beating said mixture under gas pressure to provide a product having a density of from about 30 ounces per gallon to about 65 ounces per gallon, extruding said product in a continuous strip into a zone of product quiescence and cutting said product after a period of quiescence and prior to substantial gelling.

3. A continuous process for manufacturing marshmallows comprising the steps of preparing a mixture of saccharides, gelatin and moisture, the saccharides comprising monosaccharides and disaccharides in a ratio of between about .5 and 1.5, the moisture comprising less than about 19 percent of said mixture, beating said mixture under gas pressure to provide a product having a density of from about 30 ounces per gallon to about 65 ounces per gallon, extruding said product in a continuous strip at a temperature between about 130° F. and about 105° F. into a zone of product quiescence and cutting said product after a period of quiescence and prior to substantial gelling.

4. A continuous process for manufacturing marshmallows comprising the steps of preparing a mixture of saccharides, starch, gelatin and moisture, the moisture comprising less than about 19 percent and more than about 13 percent of said mixture, the aggregate of said starch and said gelatin being less than about 7 percent, the saccharides comprising mono-saccharides and di-saccharides, the ratio of mono-saccharides to di-saccharides being in the range of from about .5 to about 1.5, beating said mixture under gas pressure to provide a product having a density of from about 30 ounces per gallon to about 65 ounces per gallon, extruding said product in a continuous strip at a temperature between about 130° F. and about 105° F. into a zone of product quiescence and cutting said product after a period of quiescence and prior to substantial gelling.

5. A continuous process for manufacturing marshmallows comprising the steps of preparing a mixture of saccharides, starch, gelatin and moisture, the moisture comprising less than about 19 percent and more than about 13 percent of said mixture, the aggregate of said starch and said gelatin being less than about 7 percent, the saccharides comprising mono-saccharides and di-saccharides, the ratio of mono-saccharides to di-saccharides being in the range of from about .5 to about 1.5, the monosaccharide comprising glucose and the di-saccharide comprising sucrose, beating said mixture under gas pressure to provide a product having a density of from about 30 ounces per gallon to about 65 ounces per gallon and having uniformly dispersed, minute air cells, extruding said product in a continuous strip at a temperature between about 130° F. and about 105° F. into a zone of product quiescence and cutting said product after a period of quiescence and prior to substantial gelling.

6. An improved marshmallow confection comprising a gelatin, monosaccharides and disaccharides, and moisture, the moisture being less than about 19 percent and the ratio of monosaccharides to disaccharides being in the range from about .5 to 1.5, the gelatin comprising less than about 7 percent of the product, and the product having a density of from about 30 ounces per gallon to about 65 ounces per gallon.

References Cited in the file of this patent

UNITED STATES PATENTS

| 1,915,528 | Haug | June 27, 1933 |
| 2,197,919 | Bowman | Apr. 23, 1940 |
| 2,678,276 | North | May 11, 1954 |

FOREIGN PATENTS

| 480,911 | Canada | Feb. 5, 1952 |

OTHER REFERENCES

"Candy Production: Methods and Formulas" by Richmond, The Manufacturing Confectioner, Chicago, Illinois, 1948, page 367.